Fig.1

May 16, 1967  H. GIRERD  3,319,615
RECIPROCATING ENGINE
Filed May 11, 1965  10 Sheets-Sheet 2

May 16, 1967  H. GIRERD  3,319,615
RECIPROCATING ENGINE
Filed May 11, 1965  10 Sheets-Sheet 4

May 16, 1967  H. GIRERD  3,319,615
RECIPROCATING ENGINE
Filed May 11, 1965  10 Sheets-Sheet 7

May 16, 1967 H. GIRERD 3,319,615
RECIPROCATING ENGINE
Filed May 11, 1965 10 Sheets-Sheet 8

Fig.14

United States Patent Office 3,319,615
Patented May 16, 1967

3,319,615
RECIPROCATING ENGINE
Henry Girerd, Paris, France, assignor of one-half to Conservatoire National des Arts et Metiers, Paris, France
Filed May 11, 1965, Ser. No. 454,832
Claims priority, application France, May 14, 1964, 3,127
15 Claims. (Cl. 123—43)

This invention relates to reciprocating engines.

In engines with opposed pistons proposed hitherto, it has been necessary to connect the pistons by a connecting-rod system in such a way as to synchronise their movements. Moreover, such engines are of rather complicated design, more particularly owing to the problems arising in connection with the distribution of working fluid.

It is an object of the present invention to provide an opposed-piston engine having a small number of component parts and furthermore not requiring any connecting-rod system for connecting the opposed pistons.

An engine in accordance with this invention has opposed pistons slidable in a single cylinder or in respective cylinders mounted to rotate within an outer casing, the casing and cylinder being provided, for the working fluid, with ports which come into alignment with each other only when these two components are in a particular angular position in relation to each other, the pistons slidable within the cylinder or cylinders defining, at least in part, at least one combustion chamber, and means, controlled by the travel of the pistons, whereby the respective cylinder is rotated. That portion of each piston which is remote from its combustion head and that portion of the casing which is adjacent thereto may have cooperating roller and cam means effective to rotate the piston in response to its motion. Further, means are provided to synchronize the movements of the opposed pistons so that the latter are always axially displaced with respect to the plane of symmetry of the engine.

In one form of construction, the engine has a single combustion chamber situated between the pistons.

In a second form of construction, the engine has two combustion chambers, each situated between the outer lateral face of one of the pistons and the corresponding end of the casing.

In a third form of construction, the engine has two piston groups each constituted by two pistons, forming an integral unit, and three combustion chambers, situated respectively between the inner two pistons and between the outer lateral face of each of the two outer pistons and the corresponding ends of the casing.

The casing may be stationary or it may be rotatable in a supporting mounting, in which latter case the cylinder may either be stationary in realtion to this mounting or may rotate in relation to it.

The cylinder may be provided with a peripheral ring gear to form a power take-off; or the roller and cam means may be toothed, one or more rollers then serving as the power take-off.

That face of the piston which is remote from its combustion head may form an inclined surface in relation to the axis of rotation of the piston and may bear against a similarly inclined surface which can turn about an axis parallel to, but not forming one with, the first axis. This plane may be formed at least partially by the inclined extremities of the plungers of a barrel-type pump.

Each piston may be hollow and mounted so as to slide and turn on a member rigidly attached to the casing, enclosing a chamber which can be brought into communication with intake and discharge pipes through distribution ports or orifices provided in the cylinder and casing. The assembly then constitutes a pump for an auxiliary fluid. Thus, the piston may contain an internal tube, so arranged as to slide within a bore in a stationary member rigidly attached to the casing and enclosing a pump chamber that can be brought into communication with intake and discharge passages provided in the said member through orifices provided in the side of the tube.

The casing and cylinder may have simple ports for the passage of the air of combustion and the exhaust gases. Alternatively, the cylinder may be provided with exhaust passages shaped like turbine blades, thus enabling a large portion of the energy in the burnt gases to be recovered either by action or by reaction.

The casing may be formed from at least two components capable of motion in relation to each other, one of these components being provided with passages for the combustion fluids, while the other carries the rollers, sliding-contact faces or rolling-contact tracks. By moving these two components in relation to each other, either according to the rotary running speed or cylically during one revolution or fraction of a revolution of the cylinder, one can regulate the periods during which the various ports are open or closed to produce the optimum values for a given running speed or power. The same result can be obtained by placing an auxiliary sleeve between the casing and the cylinder.

Various forms of construction for an engine conforming to the invention are described hereunder, by way of example only and without any limitation on the scope of the invention being implied, in conjunction with the accompanying drawings, in which.

Figure 1:
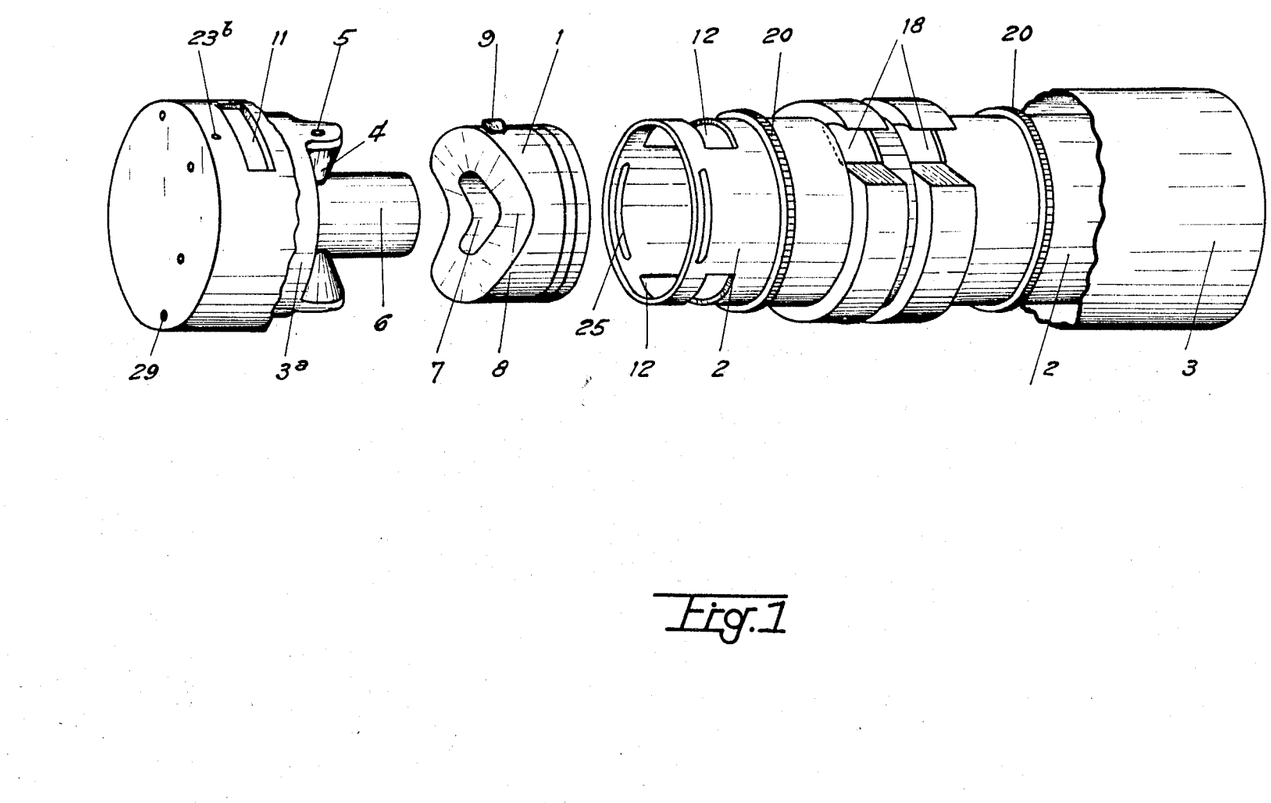
FIGURE 1 is an exploded perspective view of one form of construction shown with its casing partly broken away.
Figure 2:
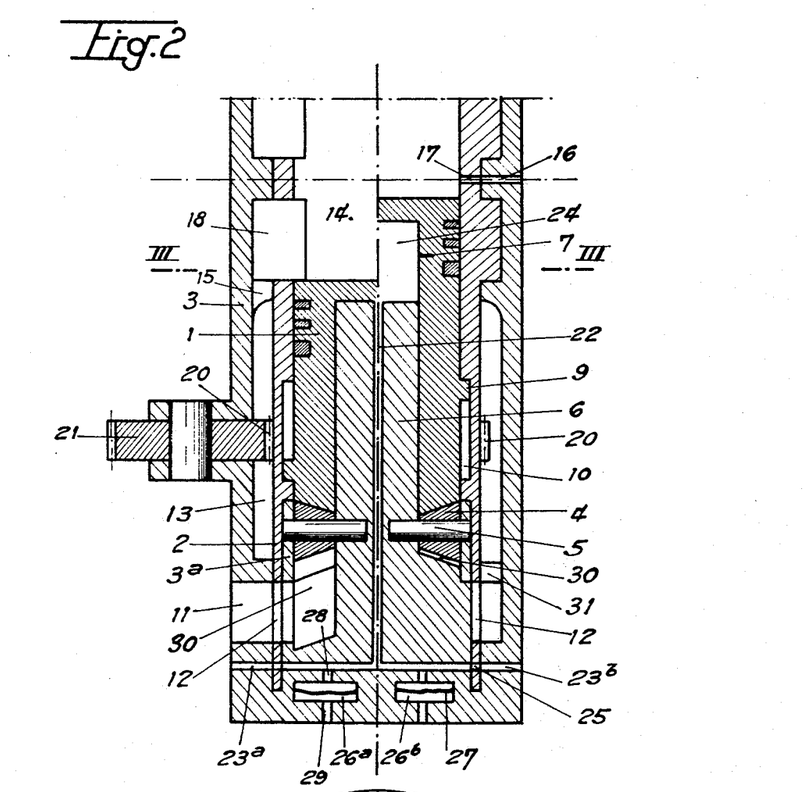
FIGURE 2 is an axial section of one half of this engine, the piston being at bottom dead center in the left-hand half of the drawing and at top dead center in the right-hand half.

Referring now to the drawings, it will be seen that the engine, in the form shown in FIGURES 1 and 2, includes two hollow pistons 1, slidably mounted within a cylinder 2, which is itself rotatably mounted with a casing 3. Each end of the cylinder 2 engages in an annular groove provided in the end of the casing and may also be guided internally by a bearing member 3a at each end of the cylinder. The skirt end of each piston bears against two conical rollers 4, spindles 5 of which are carried by the bearing member 3a and by a guide member 6, the latter being engaged in the axial bore 7 of the corresponding piston and rigidly attached to the casing 3. The skirt end of each piston is so shaped that the end face 8, which forms a cam or rolling-contact track for the rollers 4, has an external outline which, if developed, would be approximately sinusoidal. In general terms, the particular shape given to the face 8 is that which best takes into account the forces exerted theremodynamically, aerodynamically and hydrodynamically, by viscous friction and by inertia both on the pistons and on the cylinders and the components such as the rollers. Each piston has on its periphery a projection 9, which engages in a longitudinal groove 10 (FIG. 2) in the inner wall of the cylinder 2.

After ignition of a combustible charge in a combustion chamber 14 within the cylinder 2 between pistons 1, by means to be described hereafter, the pistons are driven apart. Because of the presence of the rollers 4 and of the shape of the cams or piston skirt end faces 8, the longitudinal motion of the pistons is accompanied by a turning movement thereof, which is transmitted to the cylinder 2 by projections 9 and grooves 10.

It will therefore be seen that, when the engine is running, the cylinder 2 has a rotary motion imparted to it, and always in the same direction. Moreover, the pistons travel symmetrically and in synchronism, that is, the pistons are always equally displaced with respect to the mid-point of cylinder 2 by virtue of the linkage of the pistons through the cylinder. Furthermore, because of this symmetry, the forces of inertia acting on the pistons cancel each other out in pairs, no alternating force being transmitted to the casing.

The rotary motion of cylinder 2 within casing 3 is used to control the distribution of the charge and removal of combustion products.

In each end of casing 3 there is a port 11, which is intended to communicate with an air intake duct and can be brought into communicatin with a chamber 30 lying between the skirt end of each piston 1 and the end of the casing 3, which latter end has its face shaped like the end face 8 of the piston. Each end part of the cylinder which extends between the outer wall of casing 3 and the bearing member 3a ports 12 on a level with the port 11. Communication between the port 11 and the chamber 30 is thus normally blocked and is established only when a port 12 coincides with the port 11. There is also an annular-section recess 13 lying between the cylinder 2 and the casing 3. This recess 13 can communicate with the chamber 30 whenever one of the ports 12 coincides with a port 31 in the casing 3.

Figure 3:
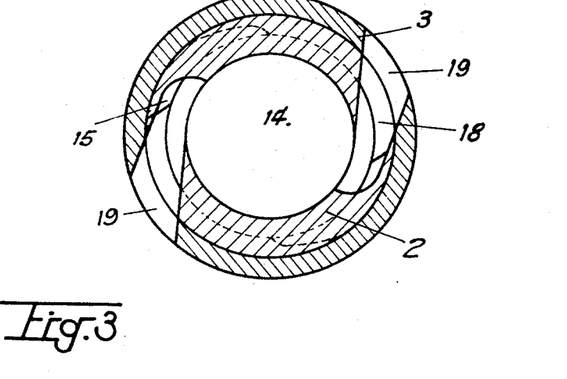
FIGURE 3 is a transverse sectional view in the plane III—III in FIGURE 2.

The recess 13 can also communicate with the combustion chamber 14, which lies between the two pistons 1, through one or more passages 15 and 18, shaped like turbine blades. The passages 15 are arranged within the thickness of the stationary casing 3 and communicate directly with the annular recess 13. Passages 18 are arranged within the thickness of the cylinder 2, immediately above the passage 15, and extend over a height which is substantially equal to the stroke of each piston 1. Communication between the recess 13 and the combustion chamber 14 is thus established whenever one of the passages 18 coincides with a corresponding one of the passages 15. One or more ports 19 (FIG. 3), intended to communicate with an exhaust pipe (not shown), are provided in the casing 3, at the same axial height as the passages 18. The combustion chamber 14 is thus opened to the exhaust pipe when the passages 18 coincide with the ports 19.

In the central part of the casing 3 there is a passage 16, which is intended to communicate with a pressurized fuel supply. An orifice 17, drilled through the cylinder 2 level with the passage 16, serves to place the latter in communication with the combustion chamber 14 whenever it passes across the said passage, thus allowing fuel to be injected into the chamber 14.

In the embodiment shown in FIGURES 1 and 2, the engine is designed to run on the Diesel cycle. In an internal-combustion engine of the gasoline type, a spark plug would be fitted in the casing 3, in the same transverse plane as the passage 16, and an orifice analogous to the orifice 17 would be provided in the cylinder 2 to uncover the plug at the appropriate moment in the cycle.

When the pistons 1 have reached their outer dead center positions, the passages 18 are in alignment with the ports 19, so that the chamber 14 is open to exhaust and the combustion gases are discharged to atmosphere. By reason of the shape of the passages 18, these exhausted gases exert on the cylinder 2 a reaction force in the direction of rotation of the cylinder. A large part of the energy remaining in the gases is thus recovered.

While the pistons 1 are near to their outer dead center positions, one of the ports 12 will have come opposite the port 11. Air can then be admitted to the chamber 30 during the compression stroke of the piston.

The pistons 1, as they continue to turn, carrying the cylinder round with them, by virtue of the inertia of the assembly, go past their outer dead center positions and start to move towards each other. Communication between the combustion chamber 14 and exhaust and the air intake ports is interrupted because of the rotation of the cylinder, so that the air within the combustion chamber is compressed.

At the appropriate moment, the orifice 17 is angularly positioned to coincide with the passage or passages 16, so that fuel is admitted to the chamber 14. The fuel mixture thus formed fires either (in the case of a diesel) by self-ignition or (in the case of a gasoline engine) by the action of a spark produced by the plug while this is opposite the opening by which it is uncovered.

As before, the pistons pass their inner dead center positions owing to the inertia of the assembly and then move apart under the action of the thrust imparted by the combustion gases.

When the pistons are near the inner dead center positions, one of the openings 12 in the cylinder 2 will have come into alignment with the port 31 in the casing 3, allowing the air compressed in the chamber 30 to enter the chamber 14 by way of the annular-section recess 13 and the passages 15 and 18 and thus to scavenge the burnt gases. In passing round the cylinder, the air cools it and at the same time recuperates part of the heat thus removed.

As the engine in the example illustrated works on the two-stroke principle and the cam or skirt end face 8 of each piston has two apices, a complete cycle corresponds to one outward and inward movement of the pistons and half a revolution of the cylinder 2. It is therefore necessary for the various communications between the combustion chamber and the air intake, the exhaust and the fuel supply to be established during each half-revolution of the cylinder 2, that is to say it is necessary to provide an even number of the ports 12, the passages 15 and the orifices 17, each of these orifices, passages and ports being diametrically opposite one another. With a four-stroke cycle, the opening and closing angles of the intake and discharge paths are different, but the principal remains the same.

The power developed by the engine can be delivered by a ring gear 20 on the cylinder 2, meshing with a pinion 21 rotatably mounted in the casing 3.

The engine can equally well be arranged to deliver fluid at high pressure, thus acting as a gasoline or oil powered pump for driving an hydraulic motor. To achieve this, with the form of construction shown in FIGURES 1 and 2, each hollow piston 1 constitutes a cylinder, mounted so as to have translational and rotary motion on the guide member 6, which thus acts as a pump plunger. This member 6 has an axial passage 22, one end of which is in communication with radial passages 23a and 23b, while the other end opens into the chamber 24, between the end of the bore 7 in the piston and the member 6. The radial passages 23a and 23b are connected respectively to fluid intake and delivery pipes (not shown). These passages can be interrupted by the end portion of the cylinder 2, which lies in the annular groove in the casing 3. This end portion has two ports, 25, diametrically opposite each other, extending substantially through 45° and in axial coincidence with the passages 23a, 23b.

During the induction and compression stroke of the piston 1, one of these ports 25 is in alignment with the passage 23a, so that fluid is drawn into the chamber 24. Then, during the firing or working stroke of the piston, the second port 25 is brought into alignment with the passage 23b, so that the fluid in the chamber 24 is driven out into a pipe (not shown) communicating with this passage.

Advantage may be taken of the variable pressure within passages 23a and 23b to bring the engine lubricating oil and the fuel to the requisite pressure. To bring this about, two recesses 26a and 26b, each divided into two chambers by a diaphragm 27 are provided in the end of the casing 3. The inner chamber of the recess 26a is in communication through the orifice 28 with the passage 23a. The outer chamber is in communication through an opening 29 with the lubricating oil intake and delivery pipes (not shown), which are fitted with valves. Recess 26b is similarly arranged, its opening 29 being connected to fuel intake and delivery pipes. Alternatively, distribution of the lubricating oil and the fuel could be effected by pumps driven from the cylinder 2 directly.

The face 8 of the piston 1 and the rollers 4 might also be toothed, to provide a positive non-slip drive to these rollers when the engine is running, and the output power might be delivered from these rollers either mechanically or hydropneumatically (by multiplunger pumps).

Figure 4:
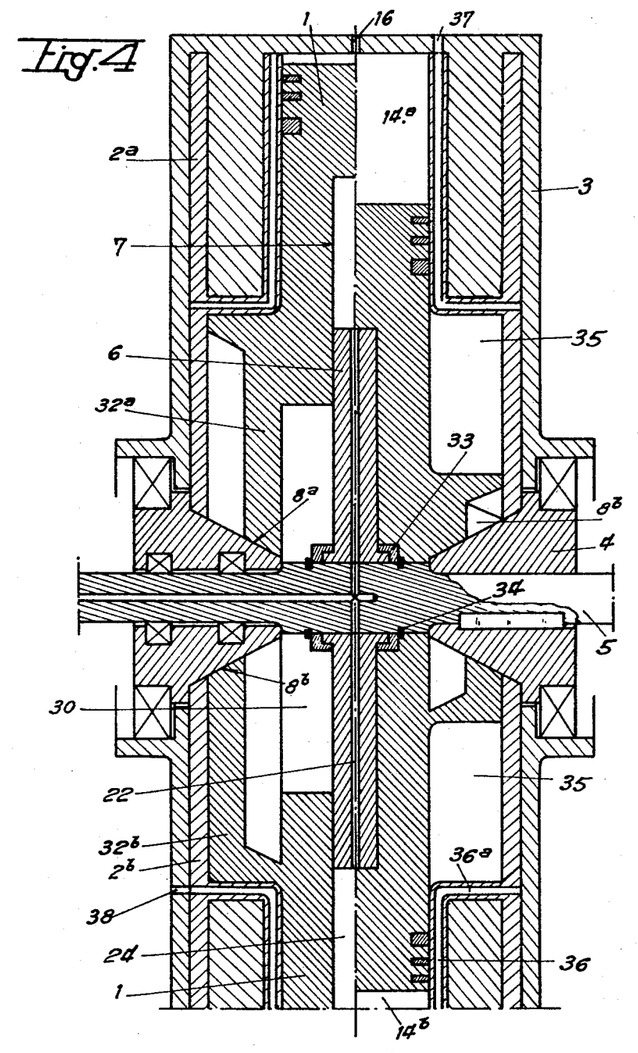
FIGURE 4 is an axial sectional view of a second form of construction.

In the embodiment shown in FIGURE 4, the engine has two separate combustion chambers 14a and 14b, each situated between one end of the casing 3 and the outer end face of one of the pistons 1. The cylinder is formed from two cylinder components 2a and 2b, situated on opposite sides of the rollers 4 fitted between the pistons 1. Moreover, each of these pistons has a widened skirt 32a or 32b. These skirts, which differ in diameter fit one inside the other.

End faces 8a and 8b of the skirts 32a and 32b are in contact with the rollers 4 and shaped in the same way as the skirt ends 8 of the piston 1 of FIGURE 1. One of the rollers 4 is keyed to its shaft 5 which serves as a power take-off, whereas the other is rotatably mounted on this shaft.

It will be noted that, in this embodiment, both of the pistons 1 are in rolling contact with the same rollers 4 and are thus constrained to rotate in opposite senses. Each of the pistons has its own cylinder, to which it is rotatably coupled by a projection and groove (not shown), as in FIGURE 1. Alternatively, the end faces of each of the cylinders 2a, 2b may be provided with gear teeth in mesh with gear teeth provided on one of the rollers 4 so as to be rotatably driven from the latter. If the rolling or cam faces 8a and 8b of the pistons are toothed and if the teeth of roller 4 in mesh with these toothed faces 8a and 8b differ in ratio from those in mesh with the cylinders, the latter will be driven at a different speed from that of the piston, which may facilitate the transference of the working fluid.

The pistons 1 are again hollow and constitute cylinders for the members 6 which act as plungers. These members 6 however are fixed to the shaft 5 by two rings 33 held in place by circlips 34. Alternatively, these members might be carried by a sleeve traversed by the shaft 5.

The engine of FIG. 4 has ports, similar to those described in the embodiment shown in FIGURE 1, for the distribution of the air and exhaust gases and of the fluid compressed in the chambers 24. Fuel injection passages 16 are provided in the ends of the casing 3.

Annular chambers 35, situated intermediate cylinders 1 and cylinders 2a and 2b between the bases of the skirts 32a and 32b and the corresponding ends of the casing, vary in volume when the engine is running and may either be opened to the atmosphere or used as pump chambers with the aid of distribution ports provided in cylinders 2a and 2b and the casing 3. On the other hand, as the chamber 30 enclosed by the skirts of the pistons is particularly large, because of the widening of the piston skirts, the engine may be over-supplied with air if chambers 35 are also used for that purpose. Thus, the chambers 35 may be used for supplying compressed air to the outside. Finally, an annular-section space 36 communicating with a radial passage 36a, may be provided in each cylinder 2a and 2b to communicate axially through an opening 37 with a source of fluid. Fluid will be drawn from opening 37 by centrifugal force into the passage 36a, from which it can be evacuated through one or more radial openings 38 in the casing 3, thereby providing effective cooling of the cylinder.

Figure 5:
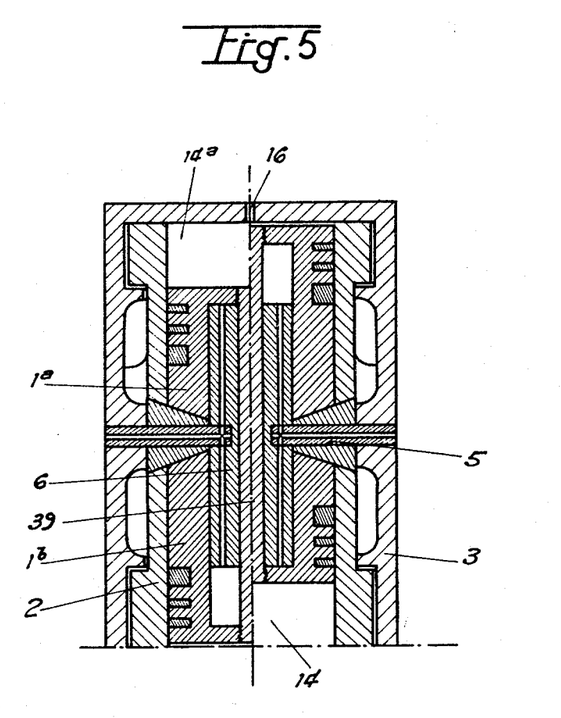
FIGURE 5 is a similar view to FIGURE 2, but showing a third form of construction.

If desired, the two embodiments described with reference to FIGS. 1 and 2 and FIG. 4 can be combined, as indicated in FIGURE 5, by the provision of a central combustion chamber 14 and two outer combustion chambers 14a and 14b. For this purpose, each piston is divided into two sub-pistons 1a and 1b, between which the rollers 4 are arranged and which are secured together by a rod 39, slidable within the member 6, the latter being fixed to the roller shaft 5, as in the example illustrated in FIGURE 4.

Figure 6:
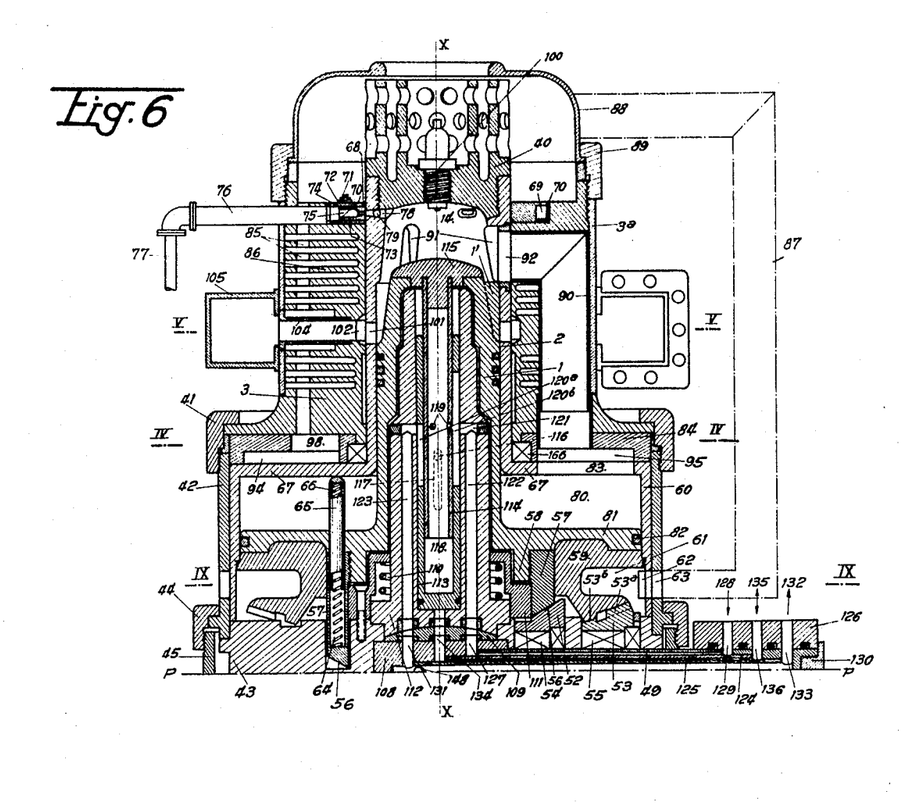
FIGURE 6 is an axial section of part of one practical form of construction of an engine in accordance with this invention.

Referring now to FIGS. 6 to 14, it will be seen that the engine embodying this invention, as illustrated particularly in FIG. 6, comprises hollow pistons 1, each slidably mounted within a cylinder 2, which is itself rotatable within a casing 3 with the aid inter alia of a thrust bearing 166. The combustion chamber 14 is formed between an outer frusto-conical face of each of the pistons 1 and a corresponding cylinder head 40, which is fixed to the end of the cylinder 2 and closes it.

Each of the casings 3 is clamped by a ring 41 to one end of a hollow cylinder 42. The other end of the cylinder 42 is held against a central plate 43 by a ring 44, which is screwed to a hollow cylinder 45. One central plate 43 is provided for each casing 3. The two plates 43 are in contact with each other and the hollow cylinder 45 is connected to both sides of the engine, above and below the plane of symmetry P of the engine, which is also the plane of separation of the two plates 43. Thus, the two casings 3 are rigidly secured to each other and the two plates 43 are held together. In addition, these two plates are connected by centering studs 46 and bolts 47, to which are screwed nuts 48 (see FIG. 7).

Figure 7:
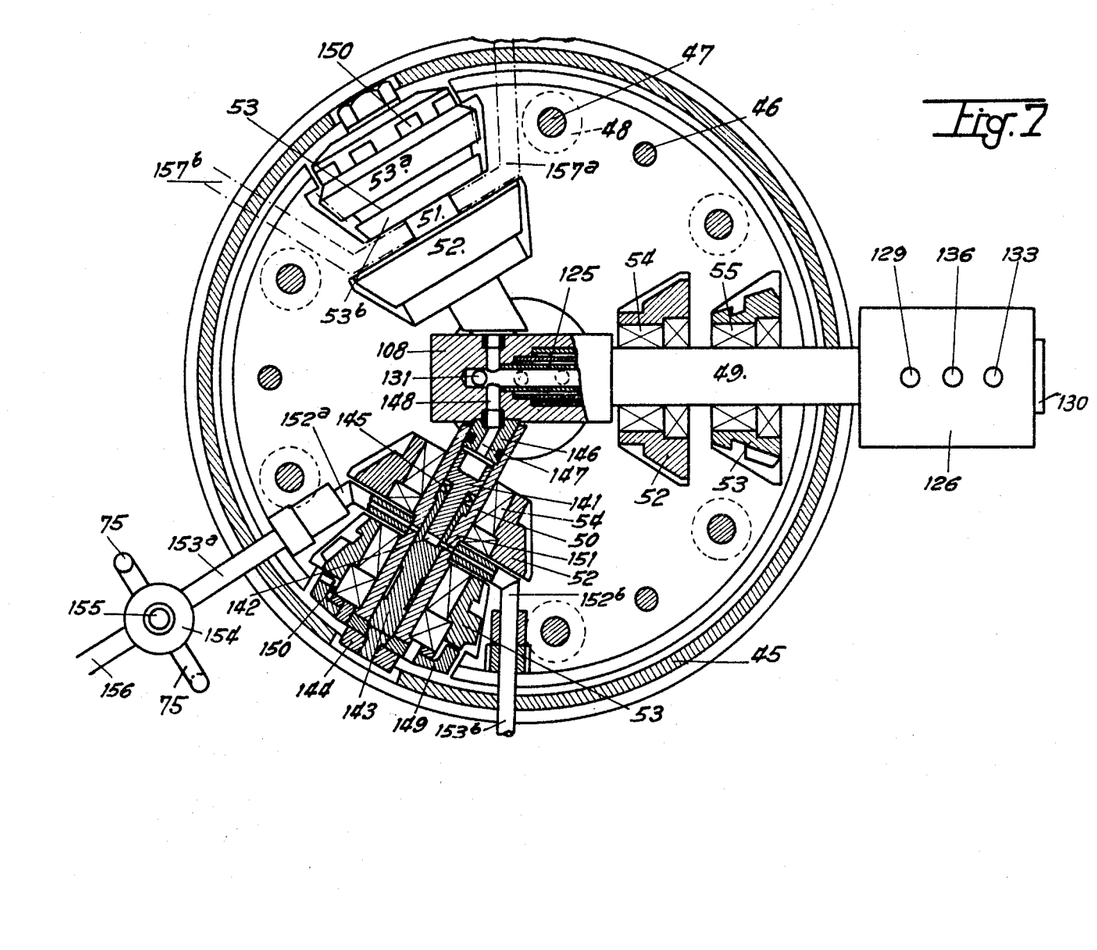
FIGURE 7 is a cross-section through the plane of symmetry P of the engine.

Situated between the plates 43 are three hollow shafts 49, 50 and 51, lying at 120° to one another. A cam roller 52 and a pinion 53 are mounted by means of thrust bearings 54 and 55 for rotation on each of these shafts.

The rollers 52 are in contact with two opposed tracks 56, each of which is provided on the end of a member 57 secured to a cylindrical extension 58 of the corresponding piston 1.

Figure 8:
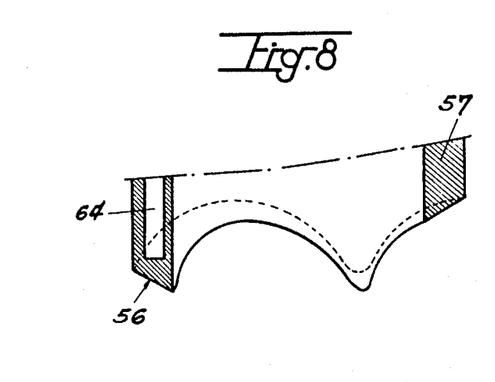
FIGURE 8 is a sectional view of the member carrying the cam or rolling-contact track.
Figure 14:
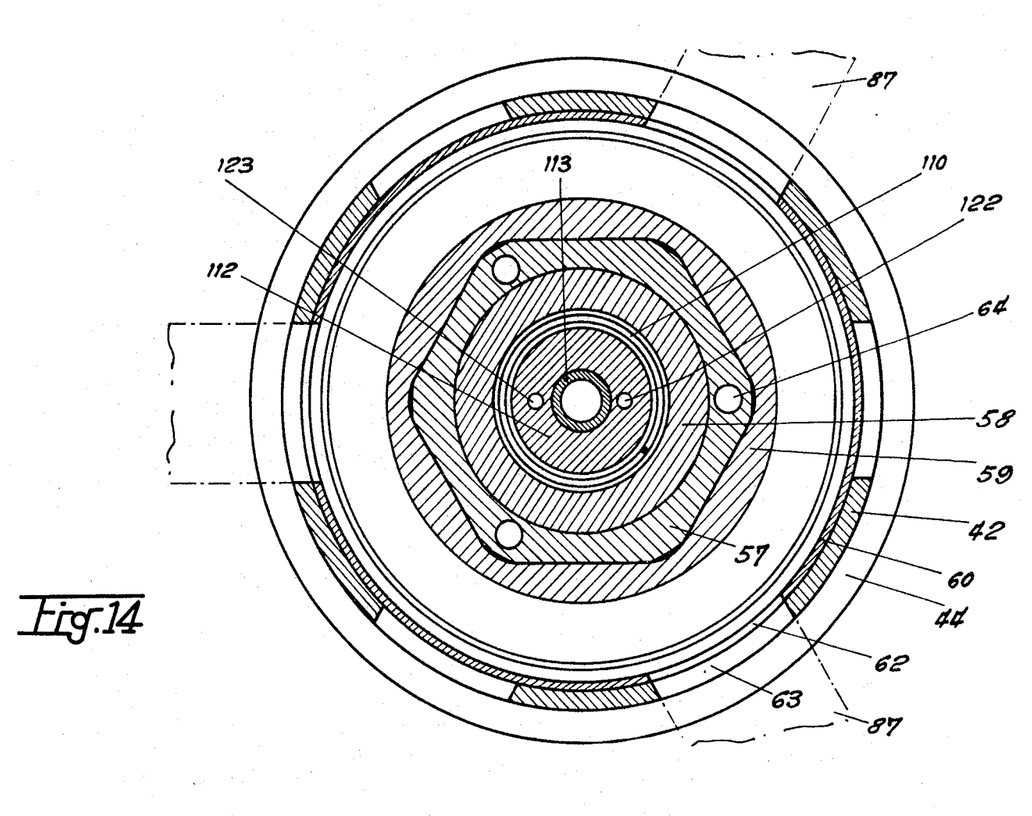
FIGURE 14 is a cross-section of the engine in the plane XIV—XIV in FIGURE 6.

The outer contour of the member 57 is shaped like a hexagon with rounded vertices (FIG. 14) and its track 56 has the form of a regular face generated by a line which forms a constant angle with the longitudinal axis X—X (FIG. 6) of the engine and is based on this axis and on a three-lobed curve traced on a cylinder centered on the axis X—X (FIG. 8). The pinions 53, on the other hand, have both teeth 53a and a track 53b, which are respectively engaged by teeth and a track provided on two follower wheels 59 situated at opposite sides of the plane of symmetry P and each fixed to an extension 60 of increased diameter of a respective one of the cylinders 2, this extension 60 being so mounted as to rotate within the hollow cylinder 42. Each wheel 59 has a hexagonal bore forming a slideway for the member 57 (as in FIGURE 14). To prevent overheating of member 57 and the extension 58 of piston 1, space 61, between each wheel 59 and the cylinder extension 60 (FIG. 6) is in communication with the exterior through apertures 62 and 63, provided respectively in the cylinder extension 60 and the hollow cylinder 42 (FIGS. 6 and 14).

The member 57 has blind longitudinal bores 64, within each of which a push rod 65 is movable. A spring 66 disposed in the bottom of the bore 64 biases the push rod 65 outwardly and holds it against a plate or flange 67 by which the cylinder 2 is joined to its extension 60. In this way, the track 56 is maintained in contact with the rollers 52 when the engine is out of action, so that untimely rotation of the pistons 1 is avoided.

It will be clear from the foregoing, that when one of the pistons 1 is driven by the thrust of the gases in the chamber 14, the track 56 constrains it at the same time to turn about its own axis. Owing to the three-lobed shape of this face or track 56, one outward and one return stroke of the piston, constituting a complete cycle in the case of a two-stroke engine, coincides with rotation of the piston through 120° and with one complete revolution of the pinions 53. This rotary motion is transmitted to the cylinder because of the hexagonal sliding fit between the follower wheel 59 and the member 57. The pinions 53 in mesh with both of the wheels 59, each of which is fixed to a respective one of the cylinders 2, ensure synchronisation of the movements of both pistons 1.

In the following description of one end of the engine, it will be appreciated that the other end is symmetrical about plane P.

In the top face of the casing 3 there is an annular member 68 having a groove 69 in its outer periphery and being surrounded by a ring 70, by which the groove is closed towards the outside. This ring 70 can turn through a few degrees within the casing, while being held by screws 71 and washers 72. The member 68 has three radial bores 73 spaced 120° apart, in each of which a plunger 74 is fitted, having an axial passage 75 opening into the groove 69. A radial pipe 76 is fixed into the casing 3 opposite an opening in the ring 70 and is connected to a pipe 77 extending substantially parallel to engine center line X—X and connected to a fuel injection pump. The cylinder 2, in turn, contains three orifices 78 on a level with the passages 75. Each of these orifices contains a ball check valve 79 seated by centrifugal force, to make the combustion chamber gas-tight.

At an appropriate moment in the compression stroke of piston 1, the orifices 78 coincide with the passages 75, so that fuel is injected into the combustion chamber 14. The injection timing can be regulated by angular displacement member 68, by means, for example, of a Bowden cable.

The air for scavenging, charging and combustion is delivered from a pump chamber 80 which is annular and is bounded by the extension 60 of cylinder 2, by the plate or flange 67, by the piston 1 and by a plate or flange 81, which forms an outward extension of the piston. This plate 81 constitutes a plunger movable within the chamber 80 and is fitted in its periphery with a piston ring 82 engaging the inner surface of extension 60.

The chamber 80 can communicate with the atmosphere through arcuate apertures 83, three in number, in the plate 67, apertures in a distributor plate 84, apertures 85 in cooling fins 86 integral with the casing 3 and a cylinder-head casing 88, which is fixed to the casing 3 by a collar 89.

The chamber 80 can alternatively communicate with the combustion chamber 14 through the apertures 83, the apertures in the distributor plate 84, inlet pipes 90 and rectangular ports 91 with rounded corners provided in the cylinder 2 at combustion chamber level and fitted with inlet inserts 92. The internal part of the cylinder 2 forming part of the boundary of the combustion chamber is frusto-conical in order to match the external frusto-conical shape of the piston 1. To reduce the dead-center space at the end of the compression stroke, the piston 1 may be provided with projections 1' complementary to the inner face of the inserts 92.

Figure 9:
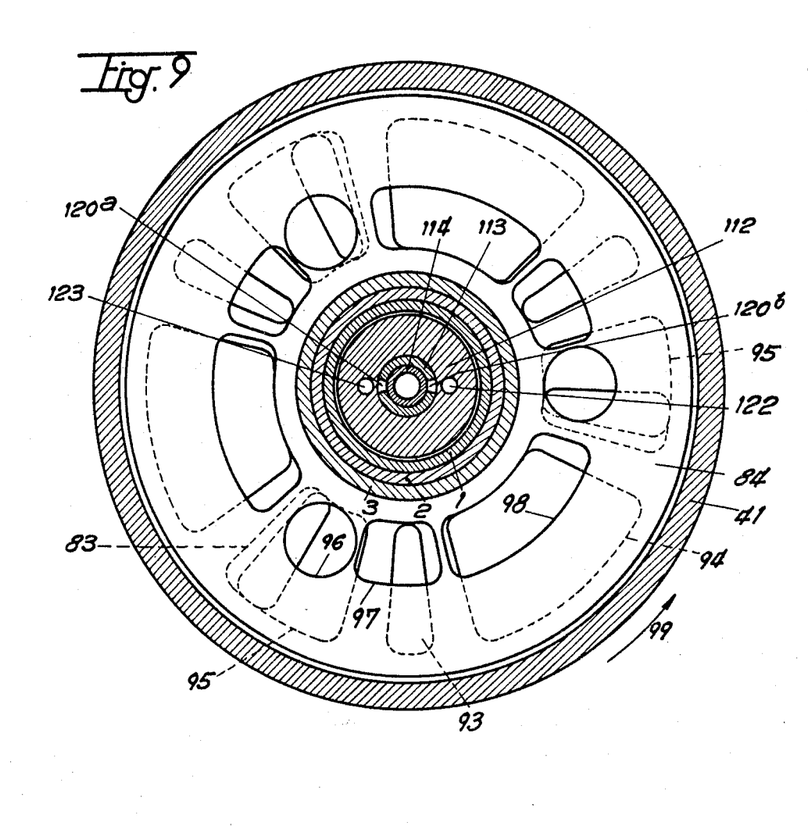
FIGURE 9 is a cross-section of the engine in the plane IX—IX in FIGURE 6.

The apertures in the distribution plate 84 are formed with two steps (FIGURE 9). In that side which faces the chamber 80, the plate contains a plurality of narrow arcuate apertures 93, extending through an arc of about 10°, wide apertures 94 extending through an arc of about 50°, and apertures of intermediate width 95, extending through an arc of about 30°. These apertures 93, 94 and 95 are spaced about 10° apart and extend across almost the full radial width of the plate 84. In its other face, the plate 84 has circular apertures 96 communicating with inlet pipes 90 and apertures 95, narrow apertures 97 communicating with the apertures 93 and opening to the atmosphere, and finally wide apertures 98 communicating with the apertures 94 and with apertures 85. The apertures 96, 97 and 98 extend only part of the way through the thickness of the plate 84.

It will be recalled that one cycle of operation is equivalent to rotation of the cylinder 2 through 120°. Assuming that the cylinder rotates in the direction of arrow 99 on FIG. 9, its apertures 83, which extend through about 10°, coincide with apertures 94 during the power stroke of the piston 1 and hence during the induction stroke of the plunger 81. Communication is thus established between the chamber 80 and atmosphere, so that this chamber fills with air, which has already been warmed by cooling the casing 3 during passage through apertures 85 in fins 86. This communication lasts while the cylinder rotates through 60°, that is to say throughout the induction stroke of the plunger 81.

Then the apertures 83 become open to the apertures 95, so that the air in the chamber 80 is driven by the plunger 81 into the inlet pipes 90. This air scavenges the combustion gases from chamber 14 and supplies and supercharges this chamber with air, until the cylinder 2 has turned far enough for its ports 91 to be no longer in alignment with the openings of inlet pipes 90.

Finally, the apertures 83 become open to the apertures 93, so that the chamber 80 is once more placed in communication with the atmosphere. In this way, unnecessary compression of the air in this chamber is avoided at the end of the recovery stroke of the plunger 81.

The combustible mixture formed in the chamber 14 is fired either by self-ignition or by means of a sparking plug 100, fitted at the center of the cylinder head 40. The combustion gases are exhausted at the end of the power stroke of piston 1.

Figure 10:
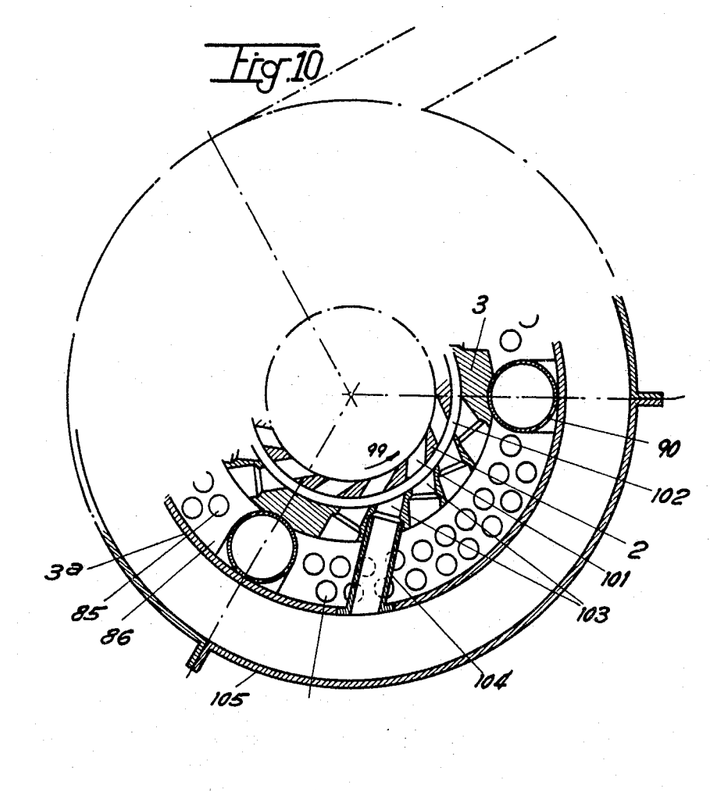
FIGURE 10 is a partial cross-section in the plane X—X in FIGURE 6.

To effect this, the cylinder 2 has a number of exhaust ports 101, which are inclined to radial planes and are at such a height that they are uncovered by the piston 1 as this nears the end of its power stroke (FIGURES 6 and 10). The casing 3 contains an internal annular groove 102 level with the ports 101. Passages 103, inclined at 45° for example, to radial planes and fitted with exhaust pipes 104, open into the groove 102. The exhaust pipes lead into an exhaust manifold 105 which surrounds the casing 3.

When the piston 1 uncovers the ports 101, the exhaust gases escape through these ports and exert a reaction force tending to turn cylinder 2 in its normal direction of rotation, indicated by the arrow 99, so that part of the energy remaining in the exhaust gases is converted into a rotary force.

Alternatively, the casing 88 extending over the cylinder head 40 can be connected by ducting 87 (shown in broken lines on FIG. 6) to certain of the apertures 62 and 63, so that the cool air entering the space 61 is heated by contact with the inner engine surfaces and then further heated by passage through apertures 85 before acting in chamber 80 on plunger 81, converting part of its heat into work during the expansion stroke of this plunger. In that case, the casing 88 must be air-tight.

The energy supplied by the engine is recovered hydraulically in the embodiment of FIGS. 6 to 14.

Where the axes of the three shafts 49, 50 and 51 (FIGURE 7) intersect, there is an end-piece 108 carried on the shaft 49. On this end-piece are two part-cylindrical members 109 (FIG. 6), which have translational motion and rotation to a limited extent. The outer face of each of these members follows the shape of a cylinder of large radius, generated by a line perpendicular to the axis of the shaft 49. A spring 110, held in position by an inserted member 111 holds a distributor casing 112 against the outer face of each of these part-cylindrical members 109. This casing 112, which cannot rotate about the axis X—X, is housed within the piston 1. A distributor 113 is slidably mounted within the casing 112 on a hollow plunger 114, one end of which is inserted with a force-fit in the combustion crown 115, which itself is fitted into the end of the piston 1. A lug 116 on the casing 112 engages in a slot 117 (appearing in broken lines on FIG. 6) in the outer face of the distributor 113 and prevents this distributor from turning.

The volume of the space 118 between the base of distributor 113 and that of the plunger 114 varies according to the displacement of the piston 1. This space, which thus constitutes a pump chamber, communicates by way of orifices 119 and ports 120a and 120b, provided respectively in the wall of plunger 114 and that of the distributor 113, with passages 121, which open into an intake duct 122 and a delivery duct 123, these ducts running longitudinally within the wall of the distributor casing 112.

The ducts 122 and 123 communicate with the exterior through the hollow shaft 49 which, for this purpose, contains two concentric tubes 124 and 125. The shaft 49 and tubes 124 and 125 fit, at their ends, into the central end-piece 108 and an external end-piece 126. The space between the shaft 49 and the tube 124 communicates with the intake duct 122 by way of orifices 127 provided in the wall of shaft 49, in end-piece 108 and in part-cylindrical member 109 and with a liquid feed connection 128 extending from a reservoir or tank through an opening 129 in the end-piece 126. Similarly, tube 125 which is closed at its outer end by a plug 130 communicates with delivery duct 123 through openings 131 in the end-piece 108 and part-cylindrical member 109 and with an outlet connection 132, for liquid under pressure, through an opening 133 in the end-piece 126. Finally, the space between the tubes 124 and 125 communicates with the end of the central bore in the casing 112 through an orifice 134 in the end-piece 108, part-cylindrical member 109 and the casing 112 itself and with a supply 135 of fluid under regulated pressure through an opening 136 in the end-piece 126. Alteration of the value of the pressure of fluid from supply 135 causes displacement of the distributor 113 in casing 112, which results in varying the speed of flow and the pressure of the liquid forced into the outlet connection 132, as explained hereunder.

Figure 11:
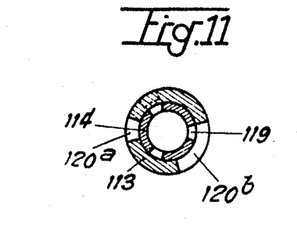
FIGURE 11 is a sectional view of the distributor.

There are three orifices 119 in the plunger 114, spaced 120° apart (FIGURE 11). Port 120a in the distributor 113 which communicates with the delivery duct 123 is substantially equal in length to the stroke of the plunger 114 and extends through an arc of approximately 30°, whereas the port 120b, which communicates with the intake duct 122 is about twice as long and is three times as wide in that part which lies above the port 120a (FIGURE 12).

Figure 12:
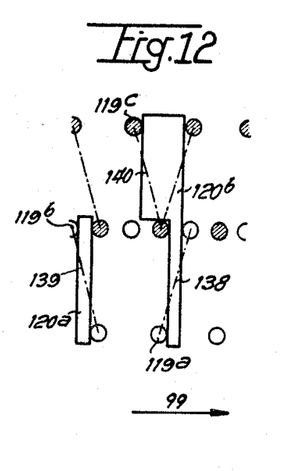
FIGURE 12 is a diagram showing how the flow of liquid delivered varies with the position of the distributor.

For an understanding of how the distributor 113 works, reference should be made to FIGURE 12, in which it has been assumed, firstly, that the piston rotates in the direction of the arrow 99 and, secondly, that, for regulation, the plunger 114 is shifted longitudinally while the distributor 113 remains stationary, which amounts to the same thing, as far as operation is concerned, to the actual situation in which distributor 113 is shifted. Orifice 119, shown shaded, thus correspond to the distributor in its low position and the others to the distributor in its high position.

When the piston 1 rises, that is, moves to reduce the volume of combustion chamber 14, carrying plunger 114 with it, one of the orifices 119, indicated by 119a in FIGURE 12, moves across the distributor intake slot 120b, the distributor being assumed to be in its raised position, as indicated by a chain line 138, so that liquid from the feed connection 128 is drawn into the space 118. During the power stroke of the piston 1, the adjacent orifice 119b moves past delivery port 120a, as indicated by a chain line 139, so that the liquid is driven to the outlet connection 132.

When the distributor 113 is in its lower position, none of the orifices 119 come opposite the delivery port 120a during the power stroke of the piston 1; instead, an orifice 119c moves past the intake port 120b, as indicated by the line 140, so that the liquid is returned to the tank.

It will be clear from FIGURE 12 that, when the distributor 113 is in an intermediate position, the liquid is initially pumped from chamber 118 to the tank and then, from a given instant onwards, to the outlet connection 132. Thus, the positioning of distributor 113 determines the volumetric rate and pressure at which fluid is pumped to outlet connection 132, for example, to operate a hydraulic motor, during each stroke of piston 1.

Part of the power developed by the engine is used for injecting the fuel into the chamber 14.

For this purpose, the hollow shaft 50 contains a sliding plunger 141 slidable in the chamber 142 of a rotary distributor 143 (FIGURE 7). The latter is held in place by a nut 144. A restoring spring 145 is interposed between the plunger and the distributor.

The hollow shaft 50 is fitted on to an end-piece 146 having an axial passage 147 in communication with the tube 125 by way of a passage 148 in the end-piece 108. The pressure of the liquid driven towards the outlet connection 132 therefore acts on the plunger 141, which is thereby driven into distributor 143 and is restored to its initial position by the spring 145 when the piston 1 rises.

Between the distributor 143 and the nut 144 is interposed a drive transmission member 149, which is provided with dogs engaging in recesses 150 in the corresponding roller-pinion 53. Thus the distributor is driven in synchronism with the motion of the piston 1, and hence with that of plunger 141, one outward and inward stroke of this plunger corresponding to one revolution of the distributor 143.

The chamber 142 has a port 151 extending through approximately 180°, which, as distributor 143 revolves, is alternately opposite the end of a duct 152a (while plunger 141 is advancing into chamber 142) and opposite the end of a duct 152b (while plunger 141 is withdrawing from this chamber); these two ducts 152a and 152b being fitted into the hollow shaft 50.

The duct 152b is connected to a fuel tank by a pipe 153b, which passes through cylinder 45. Duct 152a, on the other hand, is connected to a pipe 153a, which can communicate, by a four-way connector 154, with the two fuel injector passages 75 and with an outlet pipe 156, the flow from which can be controlled by a cock 155.

The fuel is thus drawn in through the pipe 153b and driven out through the pipe 153a to the distributor 154, from which it passes to the combustion chambers 14, the delivery to which varies according to the setting of the control cock 155.

The hollow shaft 51, similarly, contains a pump for the lubricating oil, which is taken in through the pipe 157a (chain lines) and discharged into the lubrication system of the engine through pipe 157b (chain lines).

Figure 13:
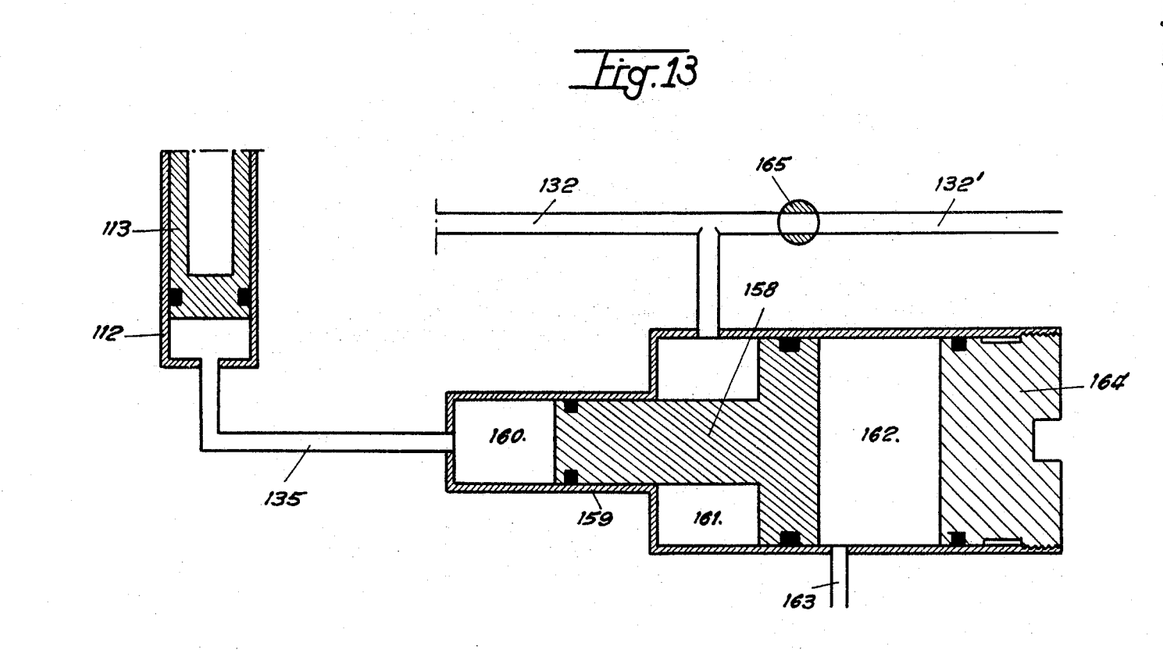
FIGURE 13 shows how the distributor is controlled by the pressure of the liquid delivered.

The control of the distributor 113 may be effected manually; or it can be controlled by the pressure of the liquid emerging from the outlet connection 132, as in FIGURE 13. In this figure, a differential plunger 158 is slidable within a cylinder 159 and thus varies the volumes of three chambers, 160, 161 and 162. The chamber 160 is of small cross-section and is connected to the pipe 135;

gas under pressure can be admitted through a jet nozzle 163 to the large chamber 162 and its pressure can be regulated by the movement of a counter-plunger 164; finally, the annular chamber 161 communicates with the outlet connection 132, which may be isolated by a cock 165 from the equipment in use, which may be, for example, a hydraulically-operated ram or a rotary motor.

For starting the cock 165 is closed. The pressure in connection 132 rises, so that the plunger 158 moves to the right (in the drawing), compressing the gas in the chamber 162. The distributor 113 descends to a lowered position, in which it nevertheless supplies the flow of liquid necessary for working the fuel and lubricant pumps.

When the cock 165 is opened, the pressure rises in a connection 132', beyond this cock, until the ram moves or the motor turns. This movement cannot occur unless the balance of power is observed, that is to say unless the thermodynamic power slightly exceeds the hydraulic power demanded.

The flow in the take-off pipe 132' controls the pressure in that pipe; the flow used, that is to say supplied, is thus determined by the position of the distributor 113, which in turn is determined by that of the plunger 158.

The invention is not limited to the embodiments described and illustrated, but includes within its scope all variants thereof. Thus, for instance, flywheels can be provided for steadying the speed of rotation of the cylinder. The latter, instead of being driven directly by the pistons, could be linked to them by any kinematic device whereby the cylinder would be driven at the same speed as the pistons or at a different speed. Rotary movement could also be imparted to the cylinder by making both it and the pistons noncircular in cross-section; such a cross-section would also enable one or more radial pumps to be driven, by virtue of their moving member being in contact with the cylinder. Also, the engine need not be an internal combustion engine; but it can be run by any fluid under pressure, such as air, oil or steam, this needing only to be admitted through one or more suitable openings.

A number of single engines (several variants of which have been described here) can be grouped together, with their longitudinal center lines lying in the same plane or in different planes.

Such engines may be coupled to each other either mechanically, by gearing, or hydraulically, the fluids taken in and compressed being distributed cyclically by a component common to a number of the single engines.

I claim:
1. In a reciprocating engine,
casing means having ports therein for the admission and the exhaust of working fluid,
hollow cylinder means rotatable within said casing, said cylinder means having ports opening through the wall thereof from the hollow interior of said cylinder means and cyclically communicating with said admission and exhaust ports of the casing means upon rotation of said cylinder means,
two independently movable piston means slidable within said cylinder means at opposite sides of a plane of symmetry of the engine and defining with said cylinder means at least one combustion chamber with which said ports of the cylinder means communicate,
means remote from said combustion chamber longitudinally positioning each of said piston means individually in said cylinder means in correspondence to the rotational position of the respective piston means and thereby effecting rotation of each said piston means upon reciprocation thereof in said cylinder means,
means rotatably coupling each said piston means with said cylinder means to effect rotation of the latter in response to said rotation of the piston means, and
means outside said interior of said cylinder means and constituted, at least in part, by said cylinder means correlating the rotational positions of said two piston means so as to, at all times, equally displace and symmetrically disposed said two piston means with respect to said plane of symmetry.

2. A reciprocating engine according to claim 1; each said piston means having an axial cavity defined therein, means connected with said casing means and extending into said cavity to define with the latter a pump chamber having an effective volume that varies in response to the longitudinal displacement of said piston means, conduit means for admitting fluid to said pump chamber during movement of said piston means in the direction to increase said effective volume of the pump chamber, and conduit means for exhausting fluid under pressure from said pump chamber to a point of use during movement of said piston means in the opposite direction.

3. A reciprocating engine according to claim 2; wherein said cylinder means has additional ports cyclically communicating with said conduit means to admit fluid to each said pump chamber and to exhaust fluid under pressure therefrom in response to rotation of said cylinder means.

4. A reciprocating engine according to claim 2; said piston means including an axially directed tubular member within said cavity and having openings for the admission and exhaust of the fluid to and from said pump chamber, said means connected with said casing means including a non-rotatable distributor sleeve telescopically engaging said tubular member so as to be interposed between said openings and said conduit means, said distributor sleeve having ports for cyclically communicating said openings with the admitting conduit means and with the exhausting conduit means in response to rotation of said tubular member with the respective piston means, and means for axially displacing said distributor sleeve and thereby varying the portions of each cycle during which said openings are communicated through said ports through the respective conduit means.

5. A reciprocating engine according to claim 4; said means connected with said casing further including a distributor casing in which said distributor sleeve is longitudinally slidable, means for admitting a control fluid to said distributor casing to act in the latter against said distributor sleeve, and means for varying the pressure of said control fluid, thereby to effect the axial displacement of said distributor sleeve.

6. A reciprocating engine according to claim 5; said means for varying the pressure of the control fluid including means responsive to deviation from a predetermined value of the pressure of the fluid in said exhausting conduit means to vary said pressure of the control fluid in the sense to restore the pressure of the exhausted fluid to said predetermined value.

7. A reciprocating engine according to claim 1; wherein the working fluid for the engine includes a combustible mixture of air and fuel, said cylinder means including an enlarged diameter portion for each piston means which enlarged portion is remote from said combustion chamber, each said piston means having a diametrically enlarged portion movable in said diametrically enlarged portion of the cylinder means to define therewith an air compression chamber, said cylinder means having ports in said enlarged portion cyclically communicated, upon rotation of said cylinder means, with air intake and air supplying ports in said casing means, said casing means further having air intake and air supplying passages extending through a portion of said casing means which surrounds said cylinder means in the region of said combustion chamber, said air intake passages opening from the atmosphere to said air intake ports so that air passing therethrough to said compression chamber cools said cylinder means and is correspondingly heated, said air supplying passages opening from said air supplying ports to certain of said admission ports of the casing means so that compressed air passing therethrough to said combustion chamber is further heated by heat transfer from said cylinder means.

8. A reciprocating engine according to claim 1; wherein at least a plurality of the ports of said cylinder means for the exhaust of working fluid are formed in a side wall of the respective combustion chamber and inclined from planes radiating from the longitudinal axis of the cylinder means so that the working fluid, when exhausted therethrough, has a turbine-like action promoting said rotation of said cylinder means.

9. A reciprocating engine according to claim 1; said cylinder means having gear teeth fixed relative thereto to constitute part of a power take-off from said engine.

10. A reciprocating engine according to claim 1; said cylinder means consisting of a single cylinder having both of said piston means therein to define a single combustion chamber between said two piston means, and each said piston means being directly coupled with said cylinder so as to prevent rotation of each said piston means relative to said cylinder, whereby said cylinder alone constitutes said means correlating the rotational positions of the two piston means.

11. A reciprocating engine according to claim 1; each said piston means including an outer piston facing away from said plane of symmetry and an inner piston facing toward said plane and fixed relative to the respective outer piston so that said inner pistons of the two piston means define with said cylinder means a first combustion chamber between said inner pistons and said outer pistons define with said cylinder means second and third combustion chambers, respectively.

12. A reciprocating engine according to claim 1; each said piston means including a single piston facing away from said plane of symmetry and said cylinder means including separate cylinders at opposite sides of said plane respectively receiving said single pistons of the two piston means to define therewith two combustion chambers, and said means correlating the rotational positions of the two piston means further including gear means rotatable between said cylinders about an axis normal to the longitudinal axis of said cylinders and teeth on said cylinders meshing with said gear means to effect synchronous rotation of said cylinders in opposite directions.

13. A reciprocating engine according to claim 12; each said single piston having a contoured surface facing toward said plane of symmetry and being toothed to engage said gear means and thereby effect said rotatable coupling of each single piston to the respective cylinder.

14. A reciprocating engine according to claim 12; said means rotatably coupling each said piston means with said cylinder means including relatively non-rotatable members slidable relative to each other in the longitudinal direction of each single piston and being respectively fixed to the latter and to the corresponding cylinder.

15. A reciprocating engine according to claim 1; said means longitudinally positioning each of said piston means individually including contoured cam means on each piston means and roller means rotatable about axes fixed in relation to said casing means and being engageable by said cam means.

References Cited by the Examiner

UNITED STATES PATENTS

| | | | |
|---|---|---|---|
| 1,276,346 | 8/1918 | Gould | 123—43 |
| 1,572,068 | 2/1926 | Gould | 123—43 |
| 1,799,772 | 4/1931 | Wormley | 123—46 X |
| 2,177,045 | 10/1939 | Serpas | 123—43 |
| 2,388,756 | 11/1945 | Meyers | 123—51 |
| 2,473,936 | 6/1949 | Burrough | 123—45 |

FOREIGN PATENTS

| | | |
|---|---|---|
| 730,941 | 8/1932 | France. |
| 310,974 | 2/1919 | Germany. |
| 1,355 | A.D. 1915 | Great Britain. |
| 16,411 | A.D. 1915 | Great Britain. |

MARK NEWMAN, *Primary Examiner.*

WENDELL E. BURNS, *Examiner.*